United States Patent
Zagar et al.

(10) Patent No.: US 11,353,624 B2
(45) Date of Patent: Jun. 7, 2022

(54) CALCULATING A RETURN PERIOD WIND SPEED

(71) Applicant: VESTAS WIND SYSTEMS A/S, Aarhus N (DK)

(72) Inventors: Mark Zagar, Sabro (DK); Karthik Vasudevan, Viby J (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 17/295,805

(22) PCT Filed: Nov. 12, 2019

(86) PCT No.: PCT/DK2019/050343
§ 371 (c)(1),
(2) Date: May 20, 2021

(87) PCT Pub. No.: WO2020/103989
PCT Pub. Date: May 28, 2020

(65) Prior Publication Data
US 2022/0026599 A1     Jan. 27, 2022

(30) Foreign Application Priority Data

Nov. 20, 2018 (DK) ............................ PA 2018 70764

(51) Int. Cl.
*G01W 1/10* (2006.01)
*F03D 17/00* (2016.01)

(52) U.S. Cl.
CPC ............... *G01W 1/10* (2013.01); *F03D 17/00* (2016.05); *F05B 2270/32* (2013.01); *F05B 2270/802* (2013.01)

(58) Field of Classification Search
CPC ...... G01W 1/10; F03D 17/00; F05B 2270/32; F05B 2270/802
See application file for complete search history.

(56) References Cited

U.S. PATENT DOCUMENTS

| 7,228,235 B2 | 6/2007 | Grzych et al. |
| 2012/0046917 A1* | 2/2012 | Fang ..................... G01W 1/10 703/1 |
| 2017/0343702 A1 | 11/2017 | Radich et al. |

FOREIGN PATENT DOCUMENTS

| CN | 105095589 A | 11/2015 | |
| EP | 2169218 A2 * | 3/2010 | ............. F03D 17/00 |
| WO | 2020103989 A2 | 5/2020 | |

OTHER PUBLICATIONS

Danish Patent and Trademark Office 1st Technical Exaination for Application No. PA 2018 70764 dated May 27, 2019.
(Continued)

*Primary Examiner* — Yoshihisa Ishizuka
(74) *Attorney, Agent, or Firm* — Patterson + Sheridan, LLP

(57) ABSTRACT

Calculating a wind speed associated with a return period at a proposed wind turbine site. The method comprises selecting a first set of storms from wind speed measurements measured at the proposed site, and selecting a second set of storms from modelled wind speeds, the modelled wind speeds being estimates of wind speeds at the proposed wind turbine site during the measurement period from a mesoscale data set. A comparison is made of characteristic wind speeds of the first and second sets of storms to determine a correction factor. A third set of storms is selected from an extended set of modelled wind speeds from an extended mesoscale data set, and the correction factor is applied to characteristic wind speeds of the third set of storms to provide corrected wind speeds. A wind speed associated with the return period is calculated from the corrected characteristic wind speeds.

20 Claims, 3 Drawing Sheets

(56) References Cited

OTHER PUBLICATIONS

Pop Lukás et al. A new method for estimating maximum wind gust speed with a given return period and a high areal resolution. Sep. 2016, Elsevier, Sep. 27, 2016, vol. 158, pp. 51-60.
Kurian V J et al. Statistical modelling of environmental load uncertainty for jacket platforms in Malaysia. Dec. 2012, IEEE, Dec. 3, 2012, pp. 74-79.
Notification of Transmittal of the International Search Report and the Written Opinion of the International Searching Authority, or the Declaration PCT/DK2019050343 dated May 20, 2020.
IEC 61400-1 ED4: Wind energy generation 1-16 systems—Part 1: Design requirements 11 88/696/FDIS, IEC, 3, Rue De Varembe, PO Box 131, CH-1211 Geneva 20, Switzerland Aug. 10, 2018 (Aug. 10, 2018), pp. 1-169.
R.I. Harris: "Gumbel re-visited—a new look at extreme value statistics applied to wind speeds", Journal of Wind Engineering and Industrial Aerodynamics, vol. 59, No. 1, Jan. 1, 1996 (Jan. 1, 1996), pp. 1-22, XP055663038.
M.D.G Dukes et al: "Estimation of Extreme Wind Speeds with Very Long Return Periods", Journal of Applied Meteorology, vol. 34, Sep. 1, 1995 (Sep. 1, 1995), pp. 1950-1961, XP055663062.

\* cited by examiner

CALCULATING A RETURN PERIOD WIND SPEED

FIELD OF THE INVENTION

The present invention relates to a method for calculating a wind speed associated with a return period at a proposed wind turbine site.

BACKGROUND OF THE INVENTION

It is important when designing and siting a wind turbine to understand the conditions that the wind turbine may face during its lifetime. Wind turbines are expected to have lifetimes of 20-25 years, and so information about likely weather conditions over a long period of time are needed.

Generally, local weather measurements for the proposed wind turbine site are not available for such long time scales. Instead, short term local measurements (e.g. measured over a year) are used to estimate an extreme wind speed that the proposed site will experience during a return period. Most commonly, a 50 year extreme wind speed is calculated—i.e. the extreme wind speed with a recurrence period of 50 years. For example, a Gumbel calculation may be performed, as detailed in IEC standard 61400-1.

Such calculations are based on very limited data sets, and so may not provide an accurate estimation of the extreme wind speed.

SUMMARY OF THE INVENTION

A first aspect of the invention provides a method of calculating a wind speed associated with a return period at a proposed wind turbine site, the method comprising: providing wind speed measurements measured at a proposed wind turbine site during a measurement period;
  selecting a first set of storms from the wind speed measurements;
  determining a characteristic wind speed for each storm of the first set of storms;
  providing a first set of modelled wind speeds, wherein the first set of modelled wind speeds are estimates of wind speeds at the proposed wind turbine site during the measurement period from a mesoscale data set;
  selecting a second set of storms from the first set of modelled wind speeds;
  determining a characteristic wind speed for each storm of the second set of storms;
  comparing the characteristic wind speeds of the first set of storms to the characteristic wind speeds of the second set of storms to determine a correction factor;
  providing an extended set of modelled wind speeds, wherein the modelled wind speeds are estimates of wind speeds at the proposed wind turbine site during an extended period from an extended mesoscale data set, and the extended period has a greater duration than the measurement period;
  selecting a third set of storms from the extended set of modelled wind speeds;
  determining a characteristic wind speed for each storm of the third set of storms;
  applying the correction factor to the characteristic wind speeds of the third set of storms to provide corrected characteristic wind speeds; and
  calculating the wind speed associated with the return period from the corrected characteristic wind speeds.

In some embodiments, determining the characteristic wind speed for each storm of the first, second, and/or third set of storms may comprise determining a strongest wind speed associated with each storm of the respective first, second, and/or third set of storms.

In some embodiments the wind speed measurements may be measured at a mast height, and providing a first set of modelled wind speeds may comprise providing a first set of modelled wind speeds for the mast height during the measurement period.

In some embodiments, selecting the second set of storms may comprise selecting storms associated with maximal wind speeds from the first set of modelled wind speeds.

In some embodiments, selecting the second set of storms comprises selecting storms from the first set of modelled wind speeds which correspond to the storms of the first set of storms.

In some embodiments, the number of storms in the first set of storms and/or the number of storms in the second set of storms may be between 5 and 20, or between 10 and 15.

In some embodiments, the number of storms in the third set of storms may be between 10 and 50, or between 10 and 30.

In some embodiments, comparing the characteristic wind speeds of the first set of storms to the characteristic wind speeds of the second set of storms comprises:
  determining a first average of the characteristic wind speeds in the first set storms;
  determining a second average of the characteristic wind speeds of the second set of storms; and
  wherein determining the correction factor comprises calculating a ratio of the first average to the second average.

In some embodiments, the measurement period may be between 6 months and 2 years, or between 9 months and 15 months.

In some embodiments, the extended period may be between 10 years and 30 years.

In some embodiments, the return period may be between 30 years and 75 years, or between 45 years and 55 years, or is 50 years.

In some embodiments, providing the wind speed measurements may comprise measuring the wind speed at the proposed wind turbine site using one or more wind speed sensors.

In some embodiments, the mesoscale data set and/or extended mesoscale data set may be generated using non-local sensor measurements.

In some embodiments, calculating the wind speed associated with the return period may comprise applying a Gumbel calculation to the wind speeds of the corrected set of extreme wind speeds.

In some embodiments, the method may further comprise altering a design parameter of a wind turbine to be built at the proposed wind turbine site based on the calculated wind speed associated with the return period.

A second aspect of the invention provides a method of designing a wind turbine, the method comprising:
  selecting a proposed wind turbine site at which the wind turbine is to be located;
  using one or more wind speed sensors, measuring wind speeds at the proposed wind turbine site during a measurement period;
  applying the method of any embodiment of the first aspect to calculate a wind speed associated with a return period for the proposed wind turbine; and altering a design parameter of the wind turbine based on the wind speed associated with the return period.

The method may further comprise constructing a wind turbine according to the design parameter.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
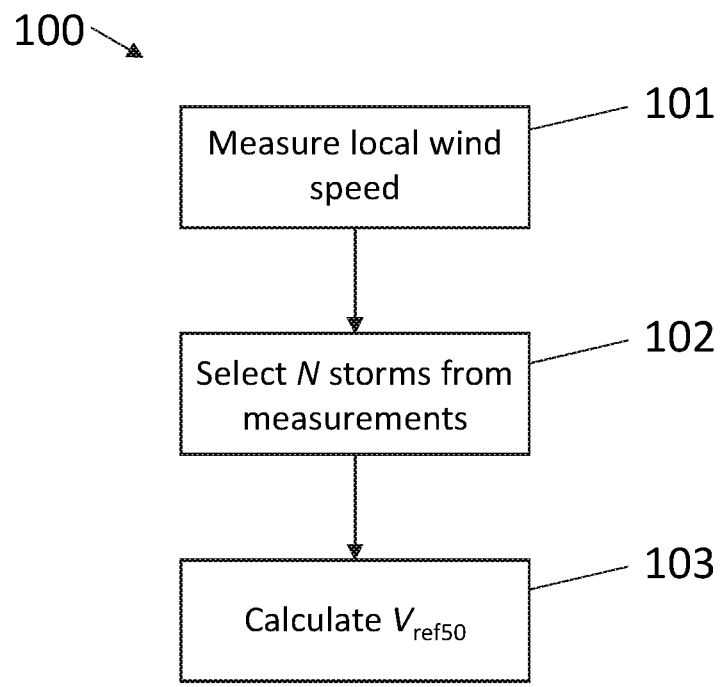
FIG. 1 illustrates a conventional method of calculating a 50 year extreme wind speed at a proposed wind turbine site.

FIG. 1 illustrates conventional method 100 for determining an extreme wind speed associated with a return period at a proposed wind turbine site, in this case a 50-year return period. Such a method may be used to estimate the extreme wind speeds that a wind turbine may face if constructed at that site. This information can be used to inform decisions about siting and construction of wind turbines.

Method 100 starts at step 101, where meteorological observations are taken at the local site over a time period T. T may typically be one year or less. During this period, the site will experience a number of storms, each storm typified by higher than average wind speeds. These storms can be identified in the meteorological observations.

At step 102, a first set of N of storms having the strongest maximum wind speeds of the storms identified in the meteorological observations are selected. The maximum wind speed of each selected storm is then used in step 103 to calculate the 50 year extreme wind speed. $V_{ref50}$, using the Gumbel method. The Gumbel method is defined in the International Electrotechnical Commission (IEC) Standard 61400-1 (section 6.3.2.1).

The calculated $V_{ref50}$ is then used as an indication of the maximum wind speed that a turbine built at the site is likely to experience in its lifetime. The turbine must be designed and constructed to withstand the maximum wind speeds expected during its lifetime, and so the $V_{ref50}$ measurement directly feeds into the design and construction of the wind turbine.

The conventional method 100 therefore uses data taken over one year or less, and extrapolates to a 50 year period. This large discrepancy between the measured data length and the forecast length can mean the resulting $V_{ref50}$ is not an accurate reflection of the wind speeds a wind turbine may face. It has been found that the actual winds experienced by a wind turbine may be 15% or more different from the 50 year extreme wind speed calculated by conventional methods. A wind turbine built on the basis of such a $V_{ref50}$ measurement may not be sufficiently configured for the local weather conditions over its lifetime. For example, a turbine built based on an inaccurate prediction may not be strong enough to withstand the actual wind speeds it will encounter during its lifetime; or the turbine may be constructed to be unnecessarily strong for the winds it will encounter, wasting resources.

The present invention provides an alternative method of calculating a wind speed associated with a return period, such as a 50 year extreme wind speed. The method uses a mesoscale model to provide modelled wind speeds for a proposed wind turbine site. The mesoscale model can provide data over a longer period than the local measurements used in the conventional method, reducing the discrepancy between the data period and the forecast period. A correction factor, based on local wind measurements, is applied to the mesoscale model to ensure it reflects local wind conditions.

The mesoscale model data may particularly be derived using a numerical model of the atmosphere. This model is a software program which numerically solves an equation system describing the atmosphere. The model is specifically set up to resolve the weather features at the mesoscale (i.e. 2-200 km). The precision and accuracy of the model output is sufficient to be used in the context of extreme event analysis. The data may cover a period of 15 years or more (for example starting in the year 2000). The model may for example provide data points with a spacing of a 2-5 km, and with a time frequency of one hour, or less. The mesoscale model may be created using data derived from global measurements, or otherwise non-local sensors. The mesoscale model is thus based on post-processed real atmospheric data, but the data is obtained using weather observations that are not specific to the proposed wind turbine site.

The method of the present invention allows an extended data set to be used to calculate the return period wind speed, and may provide a more accurate estimate of the extreme conditions a wind turbine is likely to face than conventional methods. In particular, the blending of the measured local data with the modelled wind speeds from the mesoscale data set provides locally accurate wind speed estimates, without having to make measurements at the proposed site for the full extended period.

Figure 2:
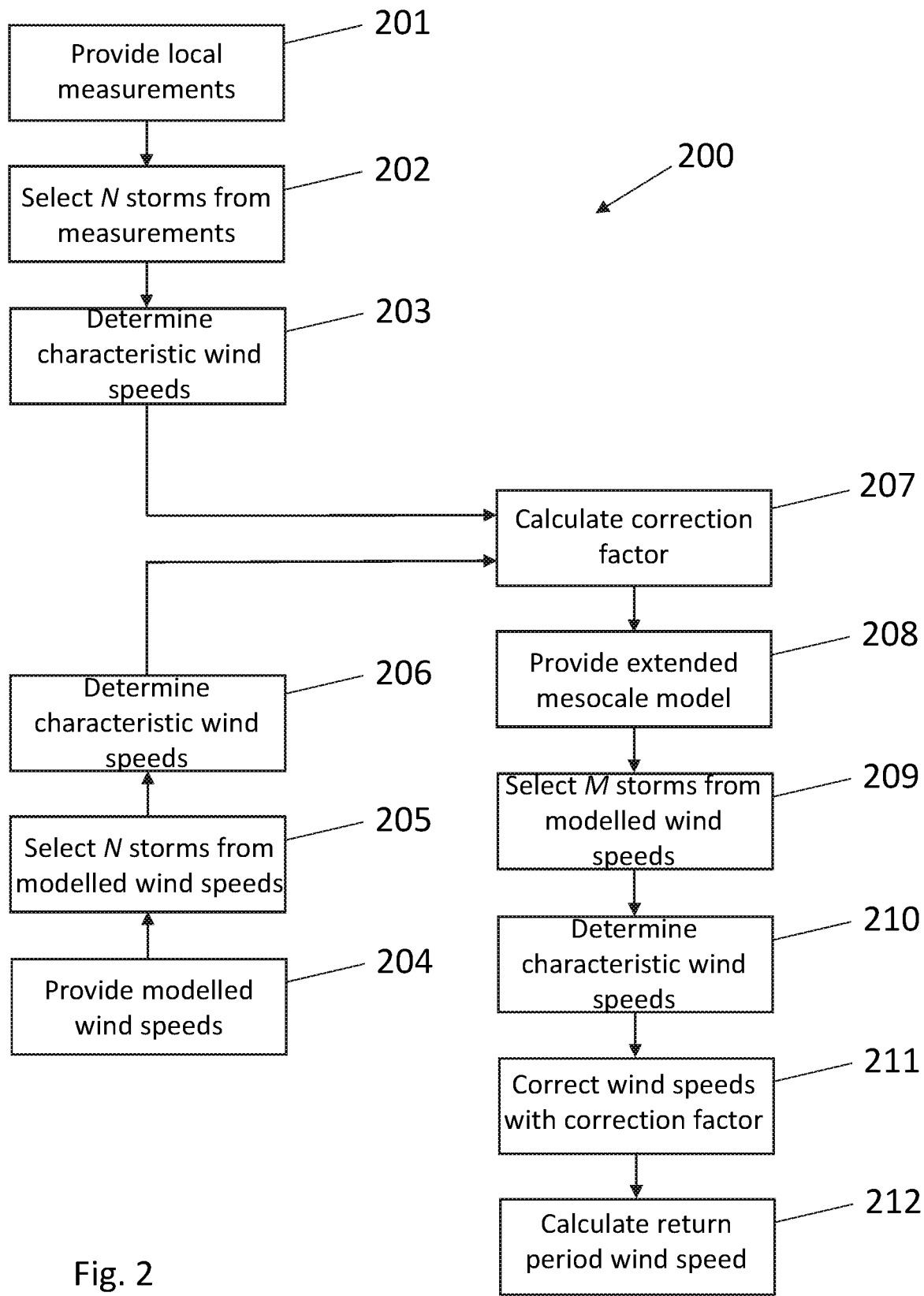
FIG. 2 illustrates a method according to the present invention of calculating an extreme wind speed associated with a return period at a proposed wind turbine site.

FIG. 2 illustrates a method 200 of calculating a wind speed associated with a return period at a proposed wind turbine site according to the present invention.

At step 201, wind speed measurements measured at a proposed wind turbine site during a measurement period are provided.

At step 202, a first set of storms is selected from the wind speed measurements. The first set of storms may be those storms identified within the wind speed measurements that are associated with the strongest wind speeds. As used herein, a weather event may be classed as a storm if the wind speed during the event exceeds the average local wind speed by a predetermined amount, and optionally for a predetermined time. In some embodiments a weather event may be classed as a storm if a wind speed during the weather event exceeds 103 km/h (64 mph).

At step 203, a characteristic wind speed for each storm of the first set of storms is determined. The characteristic wind speed characterises the strength of the wind during the respective storm, and may for example be peak (i.e. strongest) wind speed or average wind speed during the storm.

Steps 201-203 thus provide a first set of wind speeds based on local measurements at the proposed site, similar to the local measurements used in method 100 discussed above.

At step 204, a first set of modelled wind speeds is provided. The first set of modelled wind speeds are estimates of wind speeds at the proposed wind turbine site during the measurement period (i.e. the measurement period of the local measurements provided in step 201) from a mesoscale data set. The mesoscale data set provides modelled wind speed data at the mesoscale (2-200 km, or 2-5 km).

At step 205, a second set of storms is selected from the first set of modelled wind speeds. The second set of storms may be those storms identified within the modelled wind speeds that are associated with the strongest wind speeds.

At step 206, a characteristic wind speed is determined for each storm of the second set of storms. As with step 203, the characteristic wind speed characterises the strength of the wind during each respective storm. The same characteristic wind speed may particularly be used for both the first and second sets of storms—i.e. if the characteristic wind speed is peak wind speed for the respective storm, the peak wind speed of the storms in both the first set and the second set is determined.

Steps 204-206 thus provide a second set of wind speeds derived from a mesoscale model, but covering the same period of time as the local measurements. It is noted that steps 204-206 may be performed before or after steps 201-203.

The method then proceeds to use the first and second sets of storms to determine a correction factor. The correction factor is used to correct mesoscale model wind speeds to ensure they reflect the local conditions at the proposed wind turbine site.

At step 207, the characteristic wind speeds of the first set of storms are compared to the characteristic wind speeds of the second set of storms to determine a correction factor.

At step 208, an extended set of modelled wind speeds is provided. The extended set of modelled wind speeds are estimates of wind speeds at the proposed wind turbine site during an extended period from an extended mesoscale data set. The extended period has a greater duration than the measurement period of the local wind speed measurements and the first set of wind measurements described above. The first set of wind measurements may be a subset of the extended set.

At step 209, a third set of storms is selected from the extended set of modelled wind speeds. The third set of storms may be those storms identified within the extended set of modelled wind speeds that are associated with the strongest wind speeds. The third set of storms may comprise a different number of storms than the first and second sets of storms.

At step 210, a characteristic wind speed is determined for each storm of the third set of storms. As with steps 203 and 206, the characteristic wind speed characterises the strength of the wind during each respective storm. The same characteristic wind speed may particularly be used for each of the first, second, and third sets of storms.

At step 211, the correction factor is applied to each of the characteristic wind speeds of the third set of storms to provide corrected characteristic wind speeds.

Finally at step 212, the wind speed associated with the return period (e.g. a 50 year return period) is calculated from the corrected characteristic wind speeds. This calculation may use the Gumbel method described above in relation to conventional method 100. However, instead of using local measurements taken over a limited time period, the corrected characteristic wind speeds are input into the Gumbel method. These corrected characteristic wind speeds represent the wind speeds at the local site during an extended period, and so can provide a more accurate value of the wind speed associated with the return period.

The correction factor applied to the extended set of modelled wind speeds may be a ratio relating the characteristic wind speeds of the first set of storms to the characteristic wind speeds of the second set of storms. In particular, comparing the characteristic wind speeds of the first set of storms to the characteristic wind speeds of the second set of storms may comprise determining a first average of the characteristic wind speeds in the first set storms and determining a second average of the characteristic wind speeds of the second set of storms. The correction factor is then the ratio of the first average to the second average. For example, the mean characteristic wind speed of the first set of storms, $m_{local}$, and the mean characteristic wind speed of the second set of storms, $m_{meso}$, may be calculated. The correction factor is then calculated as $m_{local}/m_{meso}$. The characteristic wind speeds of the third set of storms are corrected by multiplying each characteristic wind speed by the correction factor.

In method 200, the storms selected for each set of storms may particularly be independent storms. A storm may be considered to be independent if it is separated from other storms by a predetermined period, for example four days.

The storms of the second set of storms (i.e. those selected from the first mesoscale modelled wind speeds) may be selected to match the storms in the first set of storms (i.e. those selected from the local measurements). For example, the modelled wind speeds may be analysed to correlate modelled storms with the actual storms observed in the local measurements. This allows a direct comparison between locally observed storms and their modelled counterparts.

Alternatively, storms associated with maximal wind speeds may be selected from the second set of modelled wind speeds. For example, the ten storms with the highest maximum wind speed may be selected. These storms may or may not correspond to storms identified in the measured wind speeds.

Selecting storms for the first, second, and/or third sets of storms may comprise identifying weather events in the respective measurements/modelled wind speeds (e.g. periods of increased wind speeds), and determining which weather events correspond to storms. The storms associated with the strongest wind speeds may be selected by determining a characteristic wind speed (e.g. peak wind speed, average wind speed) associated with each identified storm. Thus, the steps of determining characteristic wind speeds described above may actually be performed before a selection of storms is made for the sets of storms.

The first and/or second sets of storms may comprise between 5 and 20, or between 10 and 15 storms. Such a number of storms may be particularly suited to measurement periods of around one year. The number of storms in the first set of storms may or may not be the same as the number of storms in the second set of storms.

The number of storms in the third set of storms is typically larger than the number of storms in the first and second sets, because of the extended data set available. For example, the third set of storms may comprise between 10 and 50, or between 10 and 30 storms.

The measurement period (i.e. the duration of the local measurements taken at the proposed site) may be between 6 months and 2 years, or between 9 months and 15 months. The extended period may be between 10 years and 30 years, or may be the maximum period possible from the numerical mesoscale model of the atmosphere. The first set of measured wind speeds (used to select the second set of storms), may be a subset of the extended mesoscale modelled wind speeds which corresponds to the period of time covered by the measurement period of the local measurements.

The local measurements used for the first set of storms may be measured by local wind speed sensors installed at the site. The measurements may be performed by a sensor on a mast at a mast height. The mast height may correspond to an expected height of the wind turbine/s proposed to be built at the site. Similarly, the wind speeds in the first set of modelled wind speeds and extended set of modelled wind speeds may be modelled for the same mast height.

The wind speed associated with the return period calculated by method 200 may be used to decide whether to site a wind turbine at the proposed site, or to determine a design parameter of a wind turbine at the proposed site. The design parameter may for example be at least one of a construction material, a tower strength, a tower thickness, a blade strength, and a foundation depth. For example, if it is determined than a wind turbine at the site would experience relatively high wind speeds, the design of the wind turbine may be altered to increase its strength, by altering one or more of its design parameters.

Figure 3:
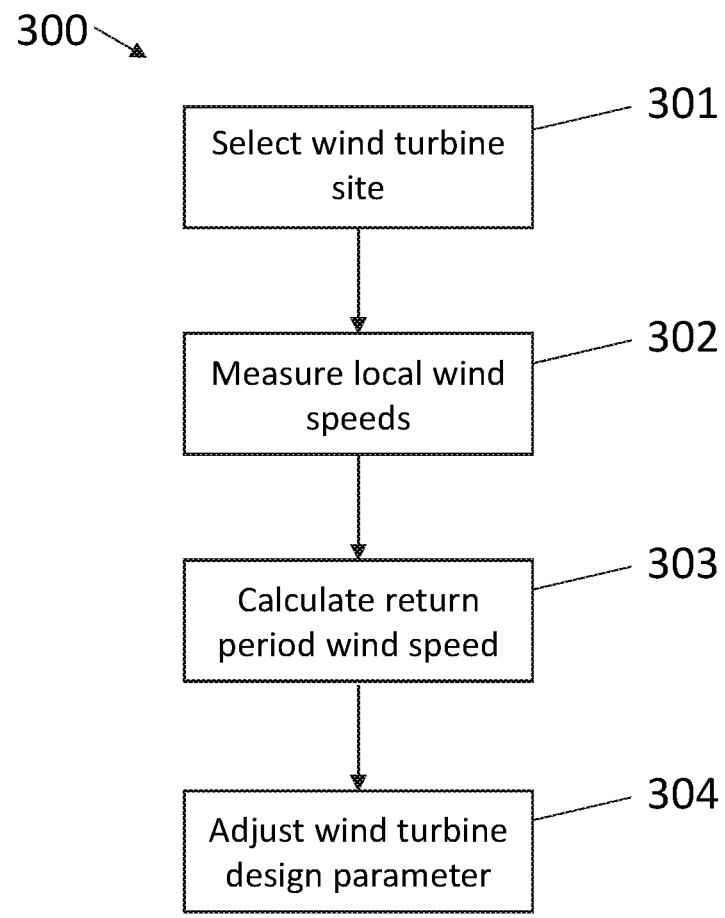
FIG. 3 illustrates a method of designing a wind turbine based on the calculated extreme wind speed associated with the return period.

FIG. 3 illustrates how the method 200 can be incorporated into a method 300 of designing a wind turbine.

Method 300 starts at step 301, at which a proposed wind turbine site at which the wind turbine is to be located is selected.

At step 302, one or more wind speed sensors are used to measuring wind speeds at the proposed wind turbine site during a measurement period. Alternatively previously measured local wind speeds may be provided.

At step 303, the measured wind speeds are used in conjunction with modelled wind speeds from a mesoscale model to calculate a wind speed associated with a return period for the proposed wind turbine, using the method 200 described above.

Finally, at step 304, a design parameter of the wind turbine is adjusted based on the wind speed associated with the return period, and the wind turbine is constructed in accordance with the design parameter. The design parameter may for example be at least one of a construction material, a tower strength, a tower thickness, a blade strength, and a foundation depth.

Although the invention has been described above with reference to one or more preferred embodiments, it will be appreciated that various changes or modifications may be made without departing from the scope of the invention as defined in the appended claims.

The invention claimed is:

1. A method of calculating a wind speed associated with a return period at a proposed wind turbine site, the method comprising:
   providing wind speed measurements measured at a proposed wind turbine site during a measurement period;
   selecting a first set of storms from the wind speed measurements;
   determining a characteristic wind speed for each storm of the first set of storms;
   providing a first set of modelled wind speeds, wherein the first set of modelled wind speeds are estimates of wind speeds at the proposed wind turbine site during the measurement period from a mesoscale data set;
   selecting a second set of storms from the first set of modelled wind speeds;
   determining a characteristic wind speed for each storm of the second set of storms;
   comparing the characteristic wind speeds of the first set of storms to the characteristic wind speeds of the second set of storms to determine a correction factor;
   providing an extended set of modelled wind speeds, wherein the modelled wind speeds are estimates of wind speeds at the proposed wind turbine site during an extended period from an extended mesoscale data set, and the extended period has a greater duration than the measurement period;
   selecting a third set of storms from the extended set of modelled wind speeds;
   determining a characteristic wind speed for each storm of the third set of storms;
   applying the correction factor to the characteristic wind speeds of the third set of storms to provide corrected characteristic wind speeds; and
   calculating the wind speed associated with the return period from the corrected characteristic wind speeds.

2. The method of claim 1, wherein determining the characteristic wind speed for each storm of the first, second, or third set of storms comprises determining a strongest wind speed associated with each storm of the respective first, second, or third set of storms.

3. The method of claim 1, wherein the wind speed measurements are measured at a mast height, and wherein providing a first set of modelled wind speeds comprises providing a first set of modelled wind speeds for the mast height during the measurement period.

4. The method of claim 1, wherein selecting the second set of storms comprises selecting storms associated with maximal wind speeds from the first set of modelled wind speeds.

5. The method of claim 1, wherein selecting the second set of storms comprises selecting storms from the first set of modelled wind speeds which correspond to the storms of the first set of storms.

6. The method of claim 1, wherein the number of storms in the first set of storms or the number of storms in the second set of storms is between 5 and 20.

7. The method of claim 1, wherein the number of storms in the third set of storms is between 10 and 50.

8. The method of claim 1, wherein comparing the characteristic wind speeds of the first set of storms to the characteristic wind speeds of the second set of storms comprises:
   determining a first average of the characteristic wind speeds in the first set of storms; and
   determining a second average of the characteristic wind speeds of the second set of storms, wherein determining the correction factor comprises calculating a ratio of the first average to the second average.

9. The method of claim 1, wherein the measurement period is between 6 months and 2 years.

10. The method of claim 1, wherein the extended period is between 10 years and 30 years.

11. The method of claim 1, wherein the return period is between 30 years and 75 years.

12. The method of claim 1, wherein providing the wind speed measurements comprises measuring the wind speed at the proposed wind turbine site using one or more wind speed sensors.

13. The method of claim 1, wherein the mesoscale data set or extended mesoscale data set is generated using non-local sensor measurements.

14. The method of claim 1, wherein calculating the wind speed associated with the return period comprises applying a Gumbel calculation to the wind speeds of the corrected set of extreme wind speeds.

15. The method of claim 1, further comprising altering a design parameter of a wind turbine to be built at the proposed wind turbine site based on the calculated wind speed associated with the return period.

16. A method, comprising:
selecting a proposed wind turbine site at which a wind turbine is to be located;
using one or more wind speed sensors, measuring wind speeds at the proposed wind turbine site during a measurement period;
calculating a wind speed associated with a return period for the proposed wind turbine site, comprising:
  providing wind speed measurements measured at the proposed wind turbine site during the measurement period;
  selecting a first set of storms from the wind speed measurements;
  determining a characteristic wind speed for each storm of the first set of storms;
  providing a first set of modelled wind speeds, wherein the first set of modelled wind speeds are estimates of wind speeds at the proposed wind turbine site during the measurement period from a mesoscale data set;
  selecting a second set of storms from the first set of modelled wind speeds;
  determining a characteristic wind speed for each storm of the second set of storms;
  comparing the characteristic wind speeds of the first set of storms to the characteristic wind speeds of the second set of storms to determine a correction factor;
  providing an extended set of modelled wind speeds, wherein the modelled wind speeds are estimates of wind speeds at the proposed wind turbine site during an extended period from an extended mesoscale data set, and the extended period has a greater duration than the measurement period;
  selecting a third set of storms from the extended set of modelled wind speeds;
  determining a characteristic wind speed for each storm of the third set of storms;
  applying the correction factor to the characteristic wind speeds of the third set of storms to provide corrected characteristic wind speeds; and
  calculating the wind speed associated with the return period from the corrected characteristic wind speeds; and
altering a design parameter of the wind turbine based on the wind speed associated with the return period.

17. The method of claim 16, further comprising constructing the wind turbine according to the design parameter.

18. The method of claim 16, wherein determining the characteristic wind speed for each storm of the first, second, or third set of storms comprises determining a strongest wind speed associated with each storm of the respective first, second, or third set of storms.

19. The method of claim 16, wherein the wind speed measurements are measured at a mast height, and wherein providing a first set of modelled wind speeds comprises providing a first set of modelled wind speeds for the mast height during the measurement period.

20. The method of claim 16, wherein selecting the second set of storms comprises selecting storms associated with maximal wind speeds from the first set of modelled wind speeds.

* * * * *